(12) United States Patent
Sarp et al.

(10) Patent No.: US 7,110,516 B2
(45) Date of Patent: Sep. 19, 2006

(54) DYNAMIC TELEPHONE CONFIGURATION

(75) Inventors: S. Murad Sarp, Charlottesville, VA (US); Angel Gonzalez, Barboursville, VA (US)

(73) Assignee: Comdial Corporation, Sarasota, FL (US)

( * ) Notice: Subject to any disclaimer, the term of this patent is extended or adjusted under 35 U.S.C. 154(b) by 35 days.

(21) Appl. No.: 10/779,671

(22) Filed: Feb. 18, 2004

(65) Prior Publication Data

US 2005/0180555 A1 Aug. 18, 2005

(51) Int. Cl.
*H04M 3/42* (2006.01)
(52) U.S. Cl. .............................. 379/201.01; 379/207.02
(58) Field of Classification Search ...................... None
See application file for complete search history.

(56) References Cited

U.S. PATENT DOCUMENTS 5,206,899 A * 4/1993 Gupta et al. ................. 379/120
5,978,450 A * 11/1999 McAllister et al. ......... 379/88.02

OTHER PUBLICATIONS

McGraw-Hill Series on Computer Communications "Voice Over Data Networks", Gilbert Held, (1998) pp. 113-126.

* cited by examiner

*Primary Examiner*—Creighton Smith
(74) *Attorney, Agent, or Firm*—Sterne Kessler Goldstein & Fox PLLC

(57) ABSTRACT

The present invention provides a dynamic telephone configuration mode for users of a telephone system. In a virtual configure mode, a user inputs a virtual extension. The input virtual extension is associated with the physical extension of the telephone being dynamically configured. The DC telephone is then operated as if it were associated with the virtual extension input by the user. In the physical configure mode, a user inputs a physical extension. The input physical extension is swapped with the physical extension of the telephone being dynamically configured. The DC telephone is then operated as if it were associated with the physical extension input by the user.

31 Claims, 17 Drawing Sheets

300

| Physical Extensions | Physical Ports | Physical Phone Features including button map with DC button |
|---|---|---|
| 3002 | 1 | |
| 3004 | 2 | |
| 3006 | 3 | |

| Virtual Extensions | User ID | Logical/Physical Mapping | Physical Phone Features including button map with DC button |
|---|---|---|---|
| 3002 | Jimi | 3 | |
| 3004 | Bob | | |
| 3006 | Janis | | |
| 3008 | Ben | | |

| Physical Extensions | Physical Ports | Physical Phone Features including button map with DC button |
|---|---|---|
| 3002 | 3 | |
| 3004 | 2 | |
| 3006 | 1 | |

| Virtual Extensions | User ID | Physical Phone Features including button map with DC button |
|---|---|---|
| 3002 | 1 | |
| 3004 | 2 | |
| 3006 | 3 | |
| Remote VoIP Phone | Network Port (and IP address of phone) | |

FIG. 13

DYNAMIC TELEPHONE CONFIGURATION

FIELD OF THE INVENTION

The present invention relates to telecommunications, and in particular to configuring terminal equipment.

BACKGROUND

A telephone system often has a number of telephones at a subscriber side. These telephones are coupled to a central office switch (CO) or private branch exchange (PBX). One or more trunk lines can couple the CO or PBX to a larger telephone network. A CO or PBX can serve one or more exchanges. An exchange is identified by a dialing prefix (3 digits are used in North America). Each telephone is assigned an extension (4 digits are used for an extension in North America). Typically these extensions are fixed during installation. See, Gilbert Held, *Voice Over Data Networks*, "Telephone Operations," Chapter 5, pp. 113–26 (McGraw-Hill Companies, Inc.: U.S.A. 1998).

A number of services or features are available in today's telephone systems. These features include call forwarding, ringing, button-map assignments, voice mail and message retrieval delivery, and others. Information identifying the particular features available at a telephone is stored in a memory at the CO or PBX. For example, a table entry associated with a particular extension can include information identifying the features available at the telephone. User settings and choices such as ring style, customized button-map assignments, greeting information and call forwarding instructions are also associated with a particular telephone. Information identifying user settings and features may be stored in memory at the telephone set or at the CO or PBX.

Once set up, all of this configuration information for a telephone is associated with a particular extension and fixed. While this may be acceptable for a telephone user who uses the same telephone at the same location, it is limiting in a variety of applications and settings. The limitations are especially burdensome when users need to be able to access multiple telephones at multiple locations. The effort a user expends optimizing settings and features for a particular telephone is lost when the user needs to use a different telephone at another location. This can impair productivity as a user may not be able to leverage available telephone features effectively.

For example, in some workplaces, a user may often work at multiple locations splitting time between a private office and a laboratory. Both of these locations may have telephones; however in many cases, the user may not be able to configure the laboratory telephone because it is shared by multiple users. This can cause frustration and limit productivity as a user may not be able to leverage certain telephone features while in the laboratory at a different extension and telephone.

Similarly, in many environments, telephones may be used by a number of different people. For example, a realty company may have several different extensions available at an office. Because the number of realtors can exceed the number of telephones, it is often impractical to assign each realtor a dedicated extension and telephone. Instead, the realtors are expected to share telephones on an as needed basis as they are available. Realtors may access the telephones at different times depending upon their schedules, the availability of the telephone or the office associated with the telephone, etc. This means a realtor is unable to customize settings for a particular telephone because he or she must move across different telephones. Configuring a particular extension is then limited to a relatively generic set up that will be acceptable to many different users.

SUMMARY OF THE INVENTION

The present invention provides dynamic telephone configuration. Embodiments include a virtual configure mode and/or a physical configure mode. In a virtual configure mode, a user inputs a virtual extension. The input virtual extension is associated with the physical extension of the telephone being dynamically configured (DC). The DC telephone is then operated as if it were associated with the virtual extension input by the user. In the physical configure mode, a user inputs a physical extension. The input physical extension is swapped with the physical extension of the telephone being dynamically configured. The DC telephone is then operated as if it were associated with the physical extension input by the user.

In some embodiments, users can draw upon configuration information at any location within a telephone system. Being able to leverage configuration information from any telephone in a telephone system is especially beneficial to users who need to use a telephone temporarily (such as a worker using a telephone at a temporary workspace) or for several users who share a common pool of telephones (such as workers using desks with telephones on an as needed basis).

In embodiments, dynamic telephone configuration functionality can be implemented in software, firmware, hardware, or any combination thereof. Further embodiments, features, and advantages of the present invention, as well as the structure and operation of the various embodiments of the present invention, are described in detail below with reference to the accompanying drawings.

BRIEF DESCRIPTION OF DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3A is a table illustrating stored physical extension configuration data.

FIG. 3B is a table illustrating stored virtual extension configuration data.

FIG. 10 is a table illustrating swapped physical extension configuration data after roaming.

FIG. 13 is a table illustrating stored physical extension configuration data including a network port extension according to an embodiment of the present invention.

Figure 1:
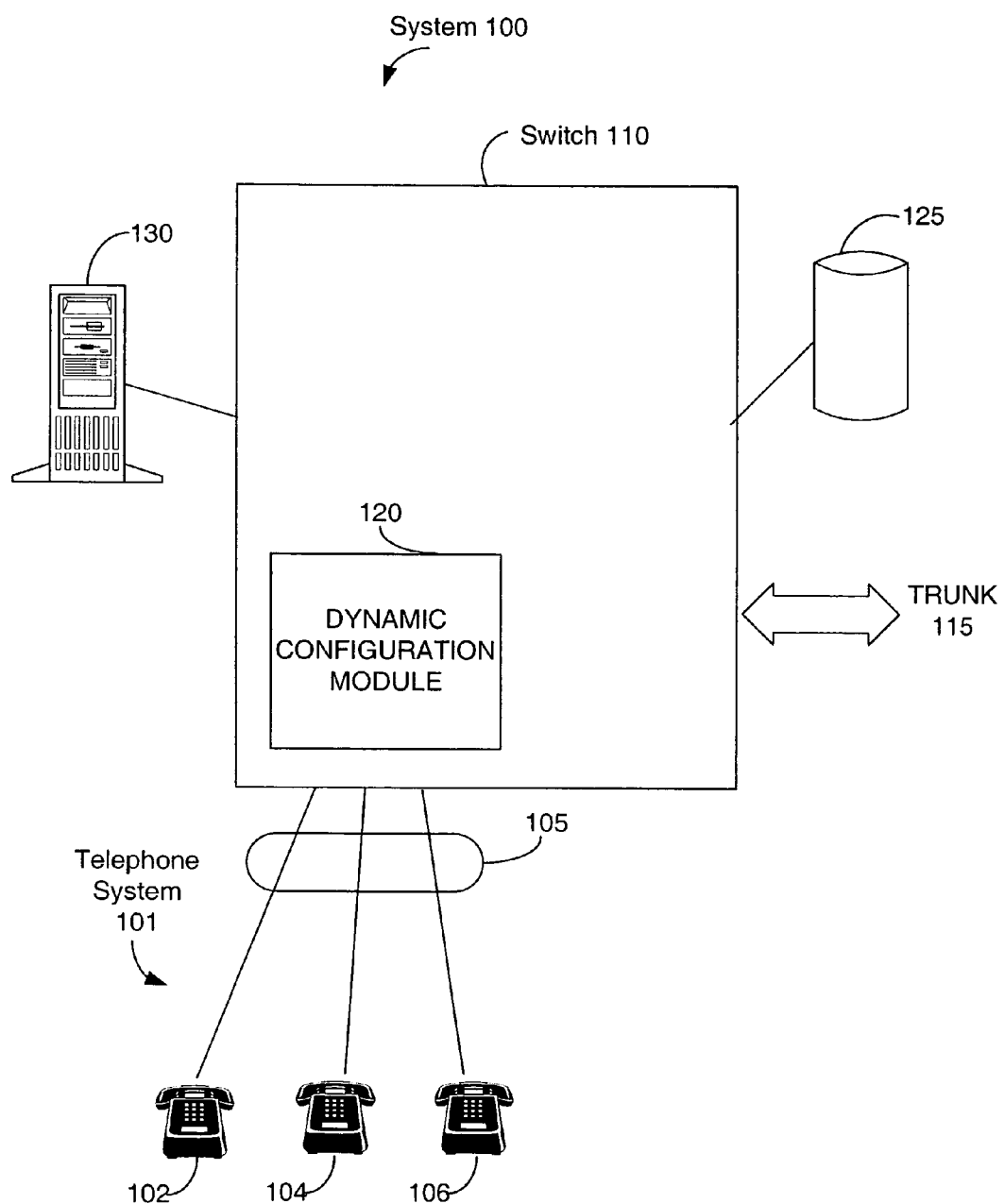
FIG. 1 is a block diagram of a system for providing dynamic configuration of telephones in a telephone system according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF EMBODIMENTS

The present invention allows users to dynamically configure telephones in a telephone system.

1. System

FIG. 1 is a diagram of a system 100 for providing dynamic configuration according to an embodiment of the present invention. System 100 includes a telephone system 101 made up of telephones 102, 104, 106 coupled through links 105 to a switch 110. Switch 110 couples telephone system 101 and trunk 115. Switch 110 can be any type of switch or device for directing inbound and outbound telephone calls to and from telephones 102, 104, 106 and trunk 115. For example, switch 110 can be a private branch exchange (PBX) or a central office (CO) switch.

Switch 110 includes physical and/or virtual extensions. Each physical extension corresponds to a link to a respective telephone 102, 104, 106. Each virtual extension corresponds to a respective user of telephone system 101. A provisioning tool 130 is also coupled to switch 110. Provisioning tool 130 can be a control program that enables a system administrator to provision physical and virtual extensions at switch 110. A memory 125 is also coupled to switch 110. Memory 125 stores data that identifies the provisioned physical and virtual extensions and other associated information.

Switch 110 further includes a dynamic configuration module 120 according to an embodiment of the present invention. Dynamic configuration module 120 can be integral with switch 110 or provided as a separate device coupled to switch 110. Dynamic configuration module 120 associates a physical extension of a telephone with a virtual extension input by user at the telephone. In this way, features associated with the virtual extension input by user can be delivered to the telephone, regardless of an initial provisioning or configuration of the physical extensions by switch 110.

Dynamic configuration module 120 can be operated in a virtual configure mode or a physical configure mode. The virtual configure mode involves virtual extensions and physical extensions, and is described below with respect to FIGS. 2–8. Physical configure mode involves physical extensions only, and is described below primarily with respect to FIGS. 9–11. In some embodiments, both the virtual configure mode and the physical configure mode can support operation with a remote voice-over IP phone, as described further below with respect to system 1200 in FIG. 12 and FIG. 13. Dynamic configuration module 120 can be implemented in software, firmware, hardware, and/or any combination thereof. An example computer platform supporting a software embodiment is described below with respect to FIG. 14.

2. Virtual Configure Mode

A. Initialization

Figure 2:
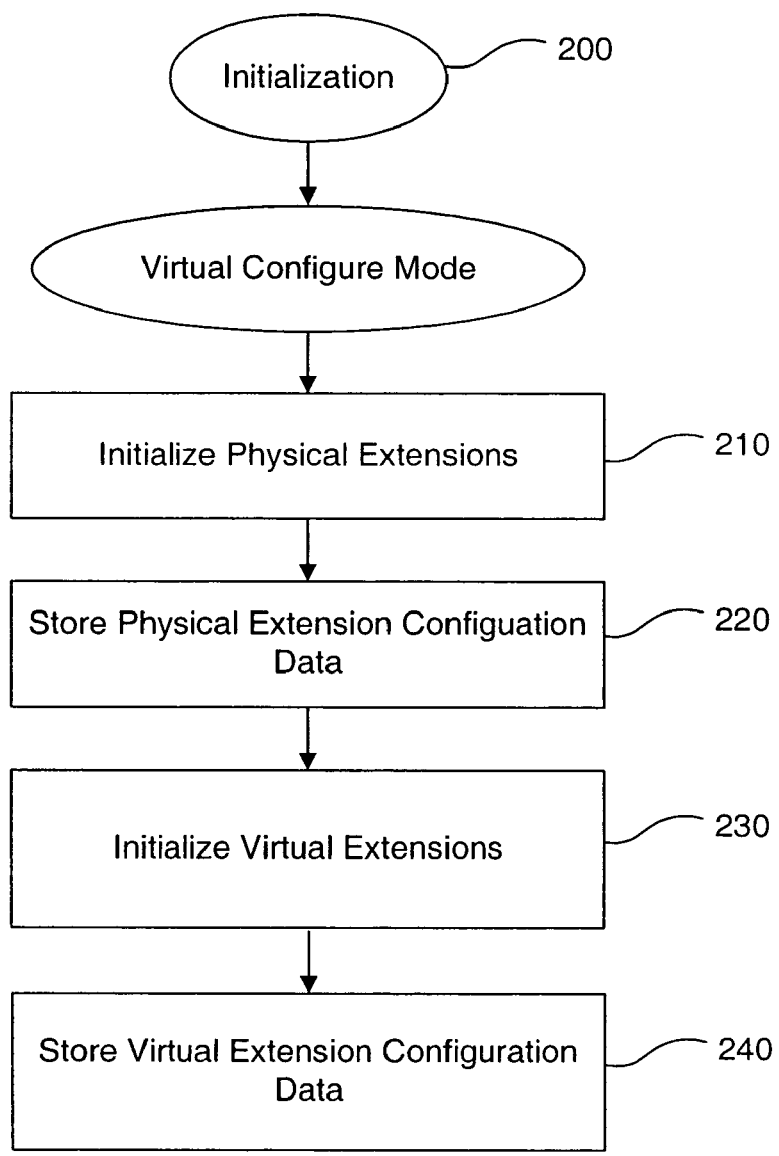
FIG. 2 is a flowchart diagram of a routine for initializing a dynamically configurable switch with physical and virtual extensions according to an embodiment of the present invention.

FIG. 2 is a flowchart diagram of a routine 200 for initializing a dynamically configurable switch with physical and virtual extensions according to an embodiment of the present invention (steps 210–240). In step 210, physical extensions are initialized. Available physical extensions are associated with available physical ports and associated phone features. For example, in North America, a 4-digit number is used to identify a physical extension. Each physical extension is associated with a particular link to a telephone. In the simple example of three telephones 102, 104, 106 in FIG. 1, three different 4-digit extensions (3002, 3004, 3006) can be assigned. Physical ports in switch 110 that lead to corresponding telephones 102, 104, 106 are then associated with the respective physical extensions. Physical phone features may also be associated with the physical extensions. Such physical phone features can be any phone system setting, user setting or service choice, including but not limited to, button-map assignments, ring style, call forwarding, call waiting, transfer, hold, greeting style, etc.

In step 220, the initialized physical extension configuration data is stored in memory. For example, memory 125 in FIG. 1 can be a database that stores physical extension configuration data. FIG. 3A shows, in tabular form, physical extension configuration data, including but not limited to physical extensions, physical ports, and physical phone feature information. In the example shown in FIG. 3A, Table 300 includes a first entry having fields that associates physical extension 3002 with physical port 1 of switch 110 and physical phone feature information. A second entry is provided that associates physical extension 3004 with physical port 2 and physical phone feature information. A third entry is provided for physical extension 3006 and associated physical port 3 and physical phone feature information. Referring to FIG. 1, in one implementation, memory 125 is a database, and provisioning tool 130 is an application that supports Virtual Mail Manager Interface (VMMI) programming. A system administrator using provisioning tool 130 can be provided with a series of control menus through a graphical user interface. Such control menus enable the system administrator to easily identify and/or edit physical extensions (e.g., add/modify/delete), associated ports and associated physical phone features in carrying out initialization step 210. Records can be generated for each provisioned physical extension and can be stored in the database in memory 125.

Returning to FIG. 2, in step 230, virtual extensions are initialized. Virtual extensions are initialized similarly to the physical extensions described above with respect to step 210. For example, in step 230, virtual extensions are associated with physical phone features. Virtual extensions, however, are generally associated with a user of telephone system 101. Virtual extensions can also be identified by a 4-digit number and further associated with a user identification (ID), such as a user name. The physical phone features associated with virtual extensions can be any phone system setting, user setting or service choice, including but not limited to, button-map assignments, ring style, call forwarding, call waiting, transfer, hold, greeting style, etc. According to an embodiment of the present invention, mapping information can also be associated with virtual extensions. Such mapping information is used to map a virtual extension to a physical port at a telephone during the dynamic configuration of the telephone. This mapping is described further below with respect to routine 400 in FIG. 4.

In step 240, virtual extension configuration data is stored. In the embodiment of FIG. 1, virtual extension configuration data is stored in memory 125. FIG. 3B shows, in tabular form, virtual extension configuration data, including but not limited to virtual extensions, user ID, mapping information, and physical phone feature information. In the example in FIG. 3B, Table 320 includes a first entry having fields that associates virtual extension 3002 with user Jimi of switch 110 and physical phone feature information. A second entry is provided that associates virtual extension 3004 with user Bob and physical phone feature information. A third entry is provided for virtual extension 3006 with user Janis and physical phone feature information. A fourth entry is provided for virtual extension 3008 with user Ben and physical phone feature information. In the embodiment of FIG. 1, each virtual extension includes mapping information for logically mapping the virtual extension to a physical port as described further below with respect to FIG. 4.

B. Operation

Figure 4A:
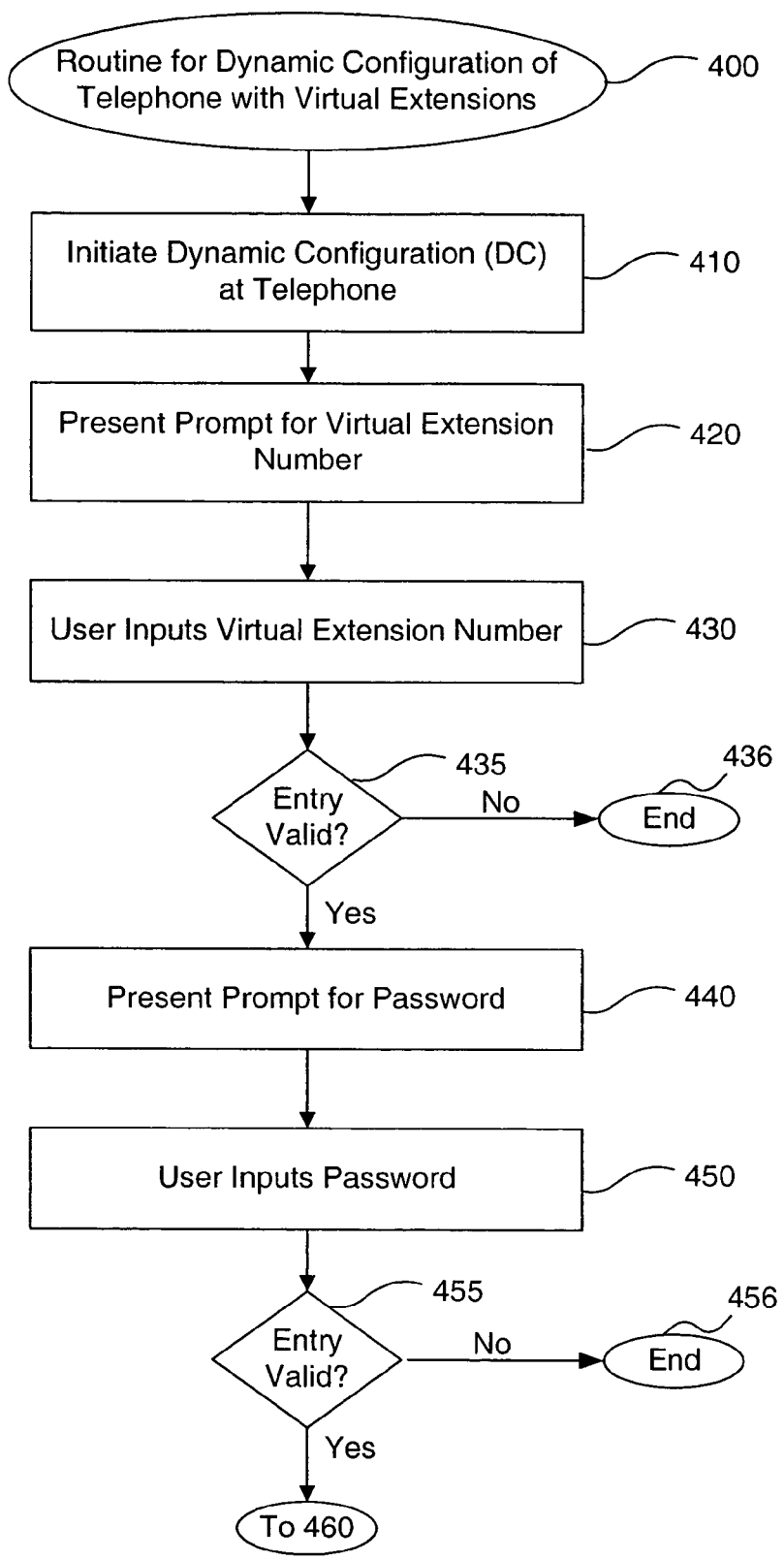
FIGS. 4A–4B are a flowchart diagram of a routine for dynamic configuration of a telephone with virtual extensions according to an embodiment of the present invention.
Figure 4B:
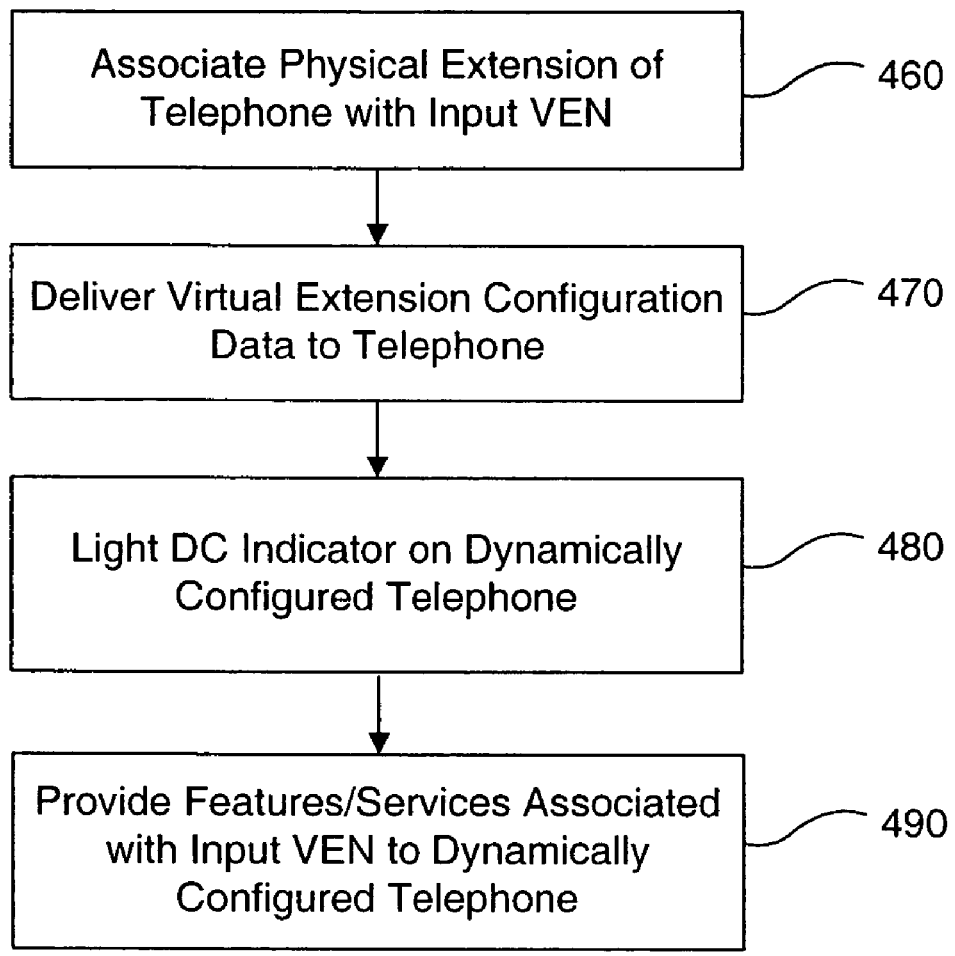

FIGS. 4A and 4B are a flowchart diagram of a routine 400 for dynamic configuration of a telephone with virtual extensions according to an embodiment of the present invention (steps 410–490). In step 410, dynamic configuration (DC) at a telephone is initiated. For example, although a user may have access to a telephone, such as telephone 106 in telephone system 101 in FIG. 1, the telephone 106 may not be configured to provide the user access to one or more features available to the telephone 106. The present invention allows the user to initiate dynamic configuration at telephone 106. For example, the user can press a particular DC button or a combination of buttons at telephone 106. In some embodiments, initiation of dynamic configuration may be voice-automated. For example, the user may provide a voice command to initiate dynamic configuration of the telephone 106. Once dynamic configuration is initiated, dynamic configuration module 120 presents a prompt for a virtual extension number (step 420). The user then inputs the virtual extension number to satisfy the prompt (step 430). For example, the prompt may appear in a display at telephone 106. The user then enters through the keypad at telephone 106 his or her virtual extension.

Returning to FIG. 4, a check is made at step 435 to determine whether the virtual extension entry is valid. In an embodiment, this check is carried out by dynamic configuration module 120 in FIG. 1 in response to the information input by the user at telephone 106. If the virtual extension number is not a valid extension number, then control proceeds to step 436 and routine 400 ends. If the entry is valid, then control proceeds to step 440. In step 440, dynamic configuration module 120 presents a prompt for a password to the user at telephone 106. For example, dynamic configuration module 120 can send instructions to telephone 106 to display a prompt to the user to input a password. In step 450, user responds to the prompt and inputs a password for telephone 106. As with step 430, the user can use the keypad of the telephone 106 to input a password. Dynamic telephone 106 then sends this input to dynamic configuration module 120. Dynamic configuration module 120 checks the password entry to determine whether it is valid. If the entry is not valid, then control proceeds to step 456 and routine 400 ends. If the entry is valid, then control proceeds to step 460 (see FIG. 4B).

In step 460, dynamic configuration module 120 associates the physical extension of a telephone from which the valid virtual extension number and password are received, in steps 430 and 450, with the virtual extension number input in step 430. For instance, consider the example where a user, Jimi, with virtual extension 3002 initiates dynamic configuration at telephone 106. Telephone 106 is coupled to switch 110 at a physical port 3 as shown in table 300. Dynamic configuration module 120 then looks up physical port 3 to determine physical extension 3006. Since Jimi inputs his virtual extension number 3002, dynamic configuration module 120 associates virtual extension 3002 with physical port 3, as shown in Table 320 in FIG. 3B. Dynamic configuration module 120 in FIG. 1 may write mapping information into a field in an appropriate record in database 125, so that the virtual extension 3002 is now associated with physical port 3.

In step 470, virtual extension configuration data is then delivered over the physical port to the dynamically configured telephone. For example, prior to Jimi dynamically configuring telephone 106, the configuration data at the telephone was probably either a default configuration or a configuration of another user. Because of Jimi's initiating dynamic configuration, virtual extension configuration data associated with virtual extension 3002 is then sent to telephone 106 through port 3. Such virtual extension configuration data can include data needed for telephone 106 to support the particular phone features associated with the virtual extension. FIG. 4 is illustrative and not intended to limit the present invention. For example, the virtual configuration data can be stored in a memory coupled to the switch in some embodiments.

In step 480, dynamic configuration module 120 in FIG. 1 sends a signal to indicate to telephone 106 that a dynamic configuration indicator should be lit on telephone 106. For example, an indicator above the dynamic configuration button can be lit to notify the user that the dynamic configuration is complete. This example is illustrative only. Other types of indicators can be used.

Figure 5:
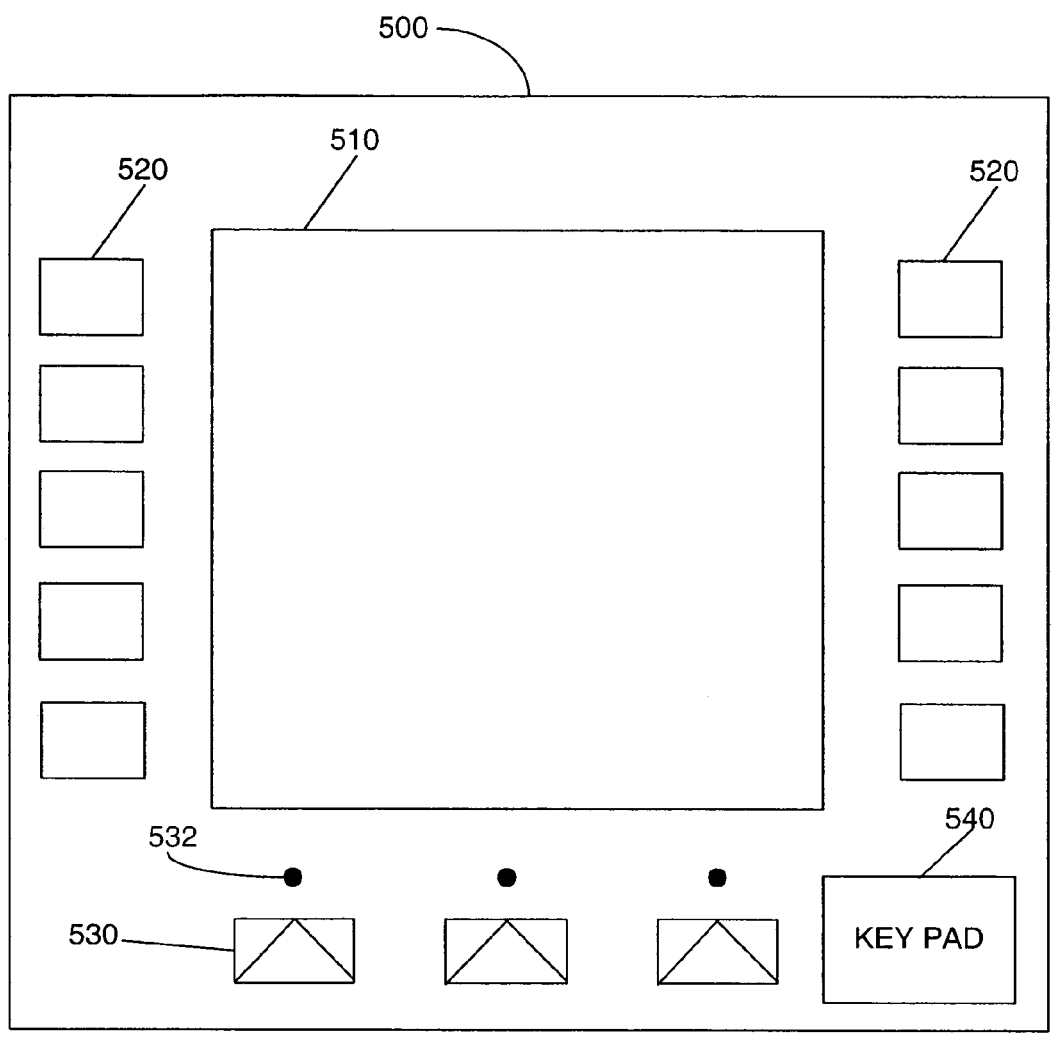
FIG. 5 is a diagram of a panel including a display screen for a telephone according to an embodiment of the present invention.

FIG. 5 is a diagram of a panel 500 that includes a display screen 510 for a telephone, such as telephone 106 in FIG. 1, according to an embodiment of the present invention. Panel 500 also includes buttons 520 for activating different phone features, such as call waiting, multiple lines, forwarding, hold, transfer, or call conferencing. Panel 500 includes a keypad 540 that may include numeric characters and any other characters for carrying out telephone operation. Additional buttons may also be provided for special features. As shown in FIG. 5, a dynamic configuration button 530 is provided to enable a user to easily initiate dynamic configuration in step 410, as described above. An indicator 532 such as a visible light-emitting diode is provided near button 530. For instance, indicator 532 can be lit as described with respect to step 480 when dynamic configuration has been carried out. Panel 500 is illustrative and not intended to limit the present invention.

Referring again to FIG. 4, in step 490, features associated with the virtual extension input in step 430 are provided to the dynamically configured telephone. User, Jimi, at telephone 106 in FIG. 1, then receives features associated with the virtual extension to which he may be accustomed. At this point, switch 110 operates in a conventional manner to support and deliver telephone features and services to telephone 106, as if the user Jimi and his virtual extension number were initially configured as being associated a physical extension at telephone 106. Step 490 is described further below with respect to specific operations in FIGS. 6–8.

Figure 6:
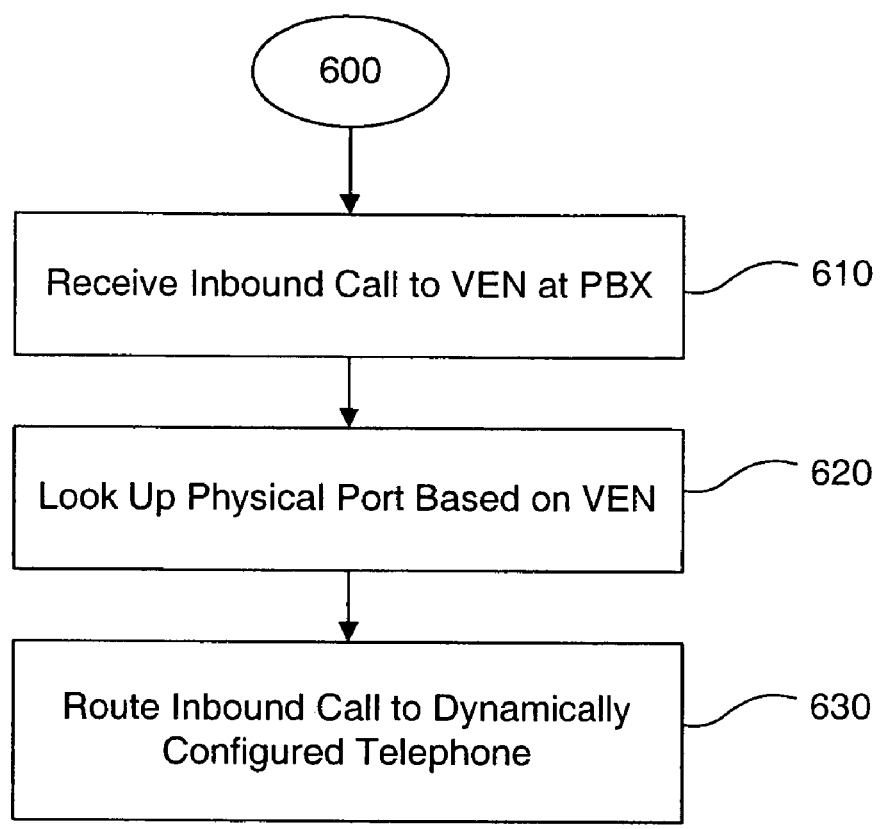
FIG. 6 is a flowchart diagram that illustrates processing of an inbound call in a dynamically configurable switch according to an embodiment of the present invention.

FIG. 6 is a flowchart diagram 600 that illustrates processing of an inbound call in a dynamically configurable switch 110 in FIG. 1 according to an embodiment of the present invention. In step 610, an inbound call to a virtual extension number (VEN) is received over trunk 115 at switch 110. Switch 110 then looks up the physical port based on the virtual extension number identified in the inbound call (step 620). This lookup includes looking at the mapping information provided by dynamic configuration module 120, as described above with respect to step 460. Switch 110 then routes the inbound call over a physical port to the dynamically configured telephone currently being used by a user associated with the virtual extension. In this way, once the user has dynamically configured a telephone based on his or her virtual extension, switch 110 will provide inbound telephone calls to the user at the dynamically configured telephone. Switch 110 can also provide other features or messages such as voicemail message indications, as well, as will be described further below with respect to FIG. 7.

Figure 7:
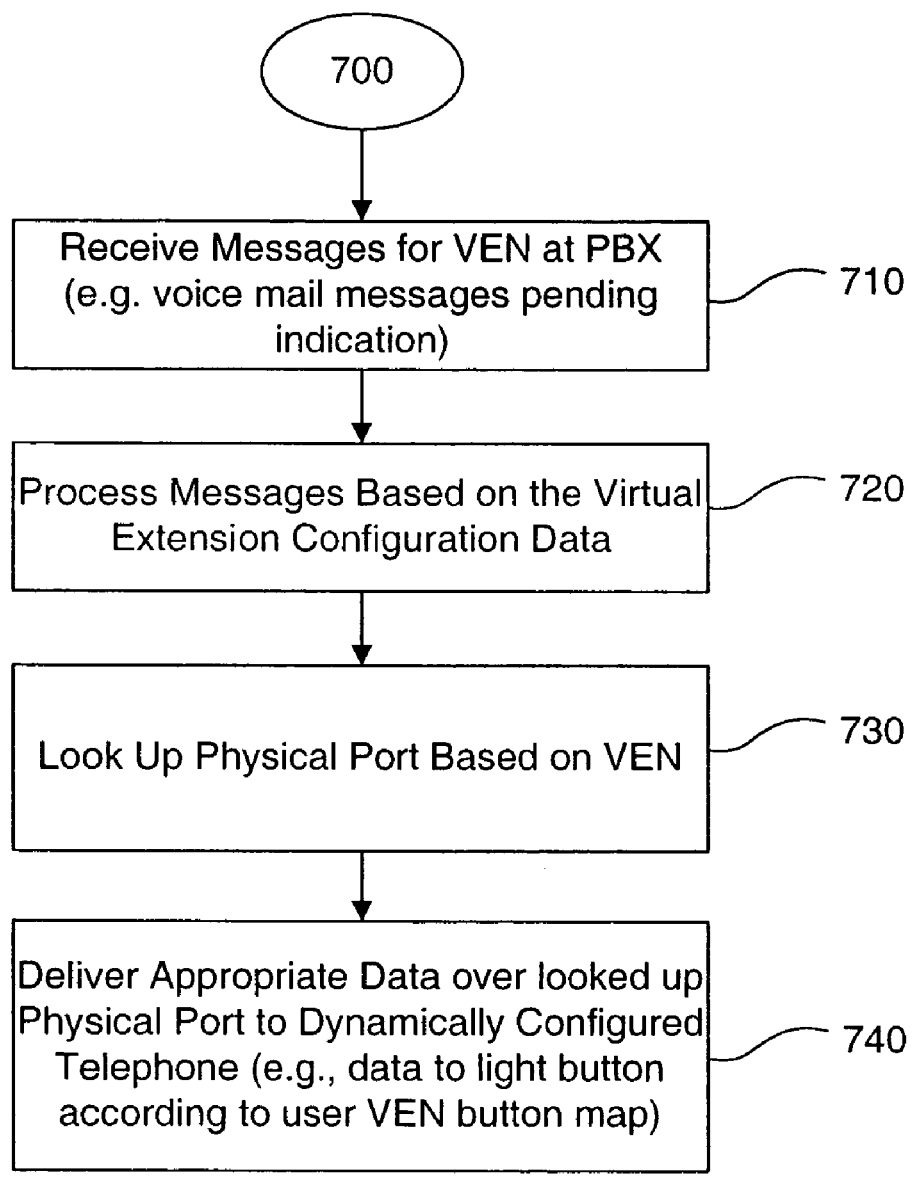
FIG. 7 is a flowchart diagram that illustrates processing of inbound messages for services supported by a dynamically configurable switch according to an embodiment of the present invention.

FIG. 7 is a flowchart diagram that illustrates a routine 700 for processing inbound messages for services supported by a dynamically configurable switch 110 in FIG. 1, according to an embodiment of the present invention. In step 710, switch 110 receives messages associated with a virtual extension. For example, such messages may be sent by a voicemail application to notify a user that a voicemail message has been received and is waiting for retrieval. Switch 110 then processes the received messages based on the virtual extension configuration data (step 720). Switch 110 looks up the physical port based on associated virtual extension data. As described with respect to step 620 above, this physical port that is looked up has been associated during dynamic configuration with a telephone at which the user having the virtual extension is now present. In step 740, switch 110 then delivers appropriate data over the looked up physical port to the dynamically configured telephone. For example, switch 110 may send a command to light a voicemail light in accordance with particular button map assignments associated with a user of the virtual extension.

Figure 8:
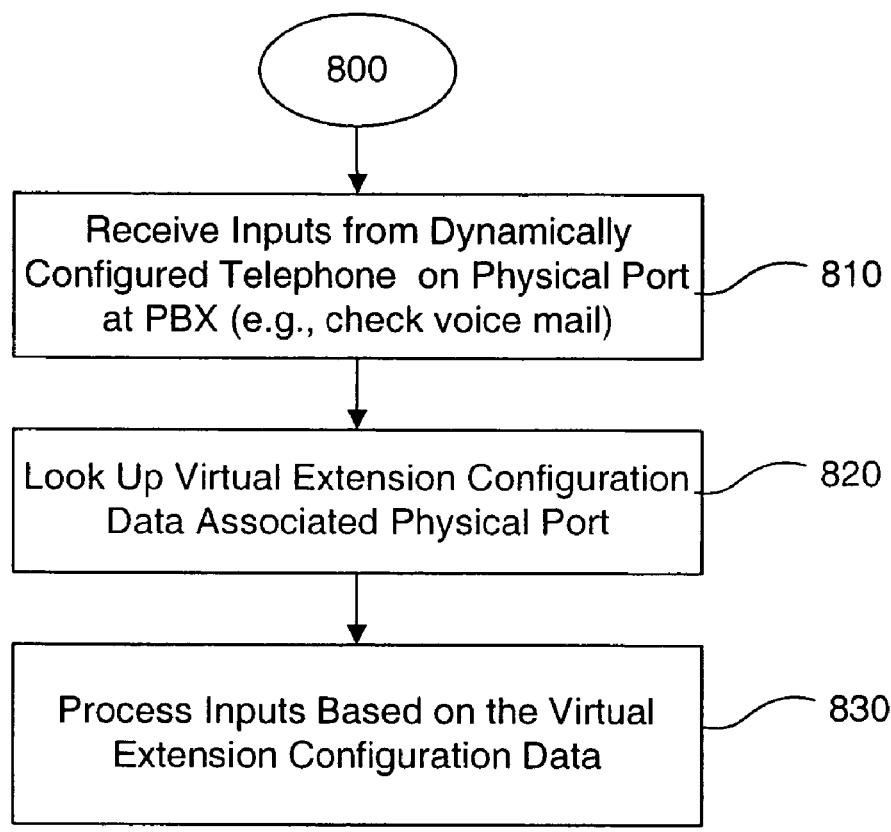
FIG. 8 is a flowchart diagram that illustrates processing of inputs from a telephone at a dynamically configurable switch according to an embodiment of the present invention.

FIG. 8 is a flowchart diagram that illustrates a routine 800 for processing inputs made by a user at the telephone, once the telephone has been dynamically configured (steps 810–830). In step 810, switch 110 in FIG. 1 receives inputs from a dynamically configured telephone on a particular physical port of switch 110. For example, the user may press a button which corresponds to a command to retrieve voicemail. Switch 110 then looks up virtual extension configuration data (e.g., physical phone feature information in the field shown in FIG. 3B) associated with the physical port on which the inputs are received (step 820). Based upon this lookup, switch 110 processes the received inputs based on the virtual extension configuration data (step 830). For example, switch 110 may look up the virtual extension configuration data and determine that the particular button command sent by the user is associated with voice message retrieval. Switch 110 will then forward the user's command to retrieve voicemail for the appropriate voicemail application. Such a voicemail application, for example, can be running locally at switch 110, or remotely in another part of the telephone network in telephone system 101.

3. Physical Configure Mode

A. Initialization

Figure 9:
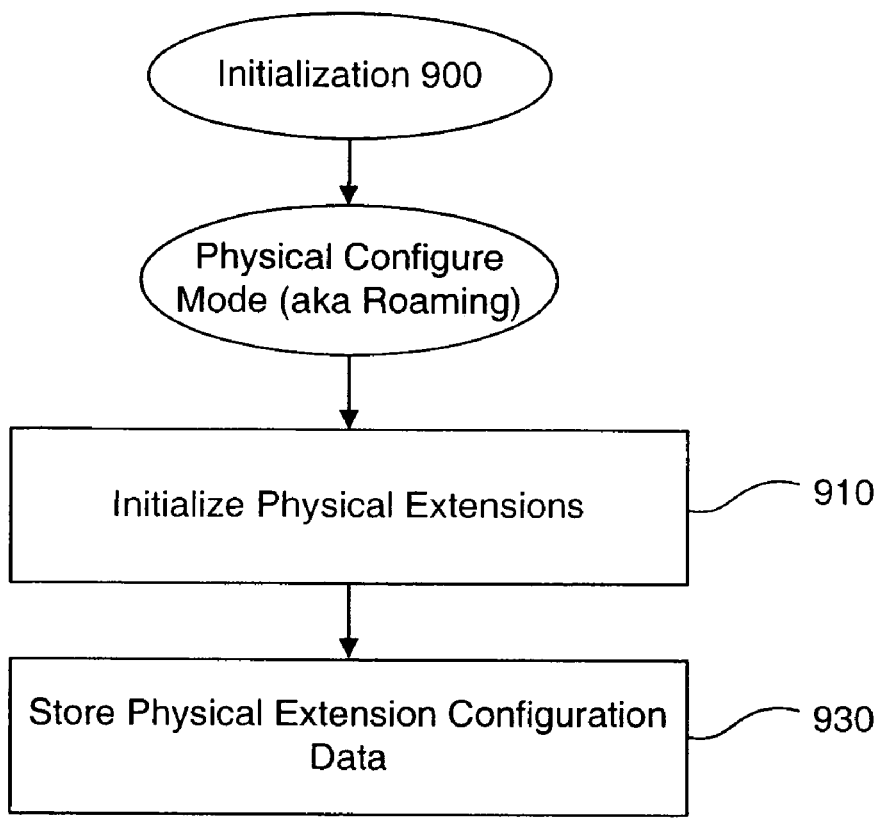
FIG. 9 is a flowchart diagram of a routine for initializing a dynamically configurable switch with physical extensions according to an embodiment of the present invention.

FIG. 9 is a flowchart diagram of a routine 900 for initializing a dynamically configurable switch with physical extensions, according to an embodiment of the present invention. In step 910, physical extensions at switch 110 are initialized. Similar to the virtual configure mode initialization described above with respect to step 210, this initialization can include initializing physical extensions, physical ports, and physical phone features for switch 110. Physical extension configuration data is then stored (step 920). For example, step 910 can be performed by a system administrator using provisioning tool 130. Control menus and other screen displays can be provided to enable user to add or modify data relating to provisioning of physical extensions. In one embodiment, a user interface is provided that assists a system administrator with VMMI programming of a database stored at memory 125. This database can be used to store physical extension configuration data in step 920. In one example, a table 300 can be generated and stored, as described above with respect to FIG. 3A.

B. Operation

In the physical configure mode, a user inputs a physical extension. The input physical extension is swapped with the physical extension of the telephone being dynamically configured (i.e. the DC telephone). The DC telephone is then operated as if it were associated with the physical extension input by the user.

For example, referring to FIG. 1, a user may be present at telephone 106 in telephone system 101, rather than at telephone 102 in telephone system 101. The user (or system administrator) may have already configured telephone 102 to make optimal use of certain features available to telephone 102. Telephone 102, for example, may be at a desk in a cubicle in which the user normally works. While near telephone 106, however, the user may desire to take advantage of the features configured previously with respect to telephone 102. The present invention allows the user to initiate dynamic configuration at telephone 106. For example, the user can press a particular DC button at telephone 106 to initiate dynamic configuration.

Figure 11A:
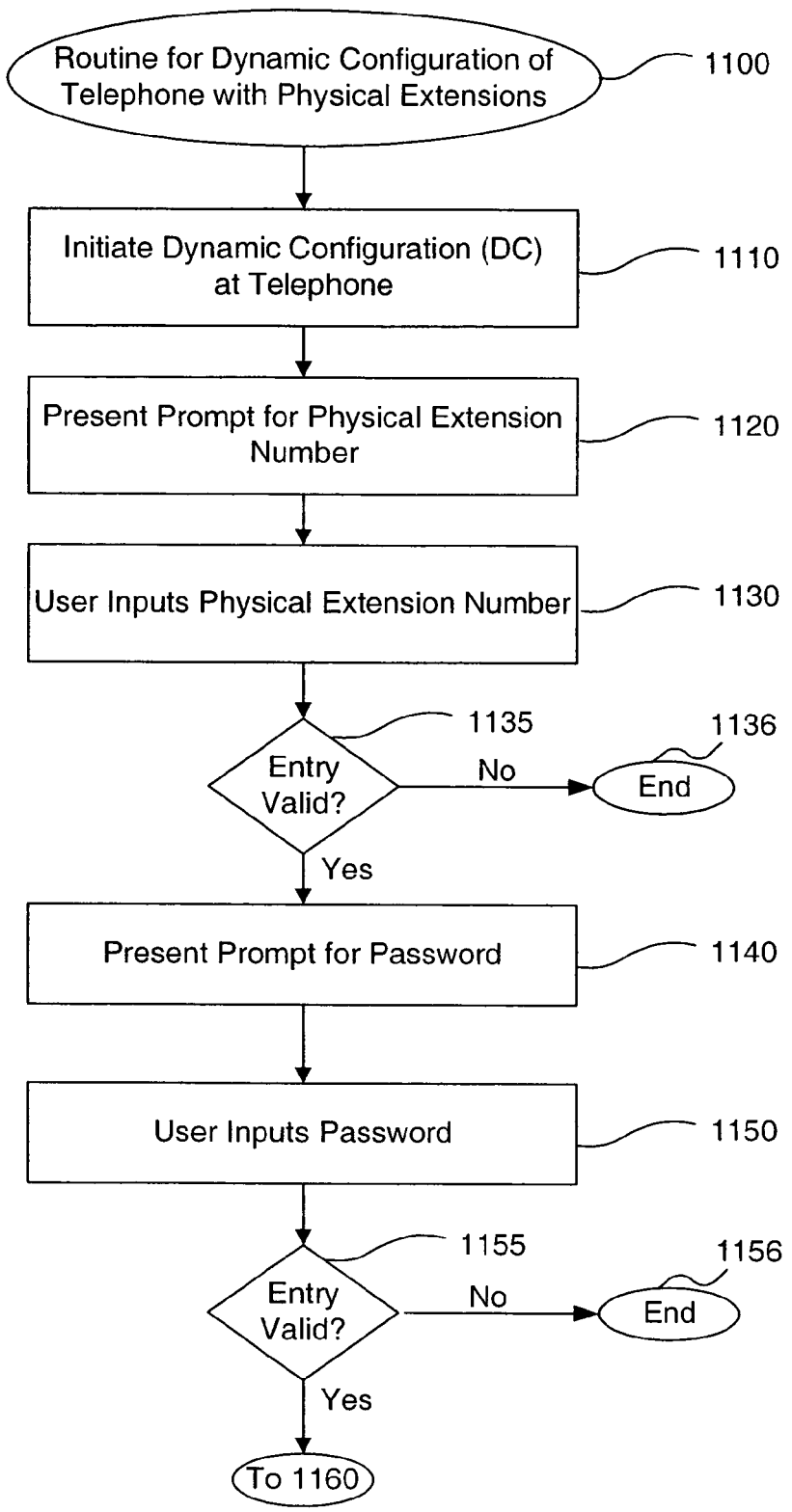
FIGS. 11A–11B are a flowchart diagram of a routine for dynamic configuration of a telephone with physical extensions according to an embodiment of the present invention.
Figure 11B:
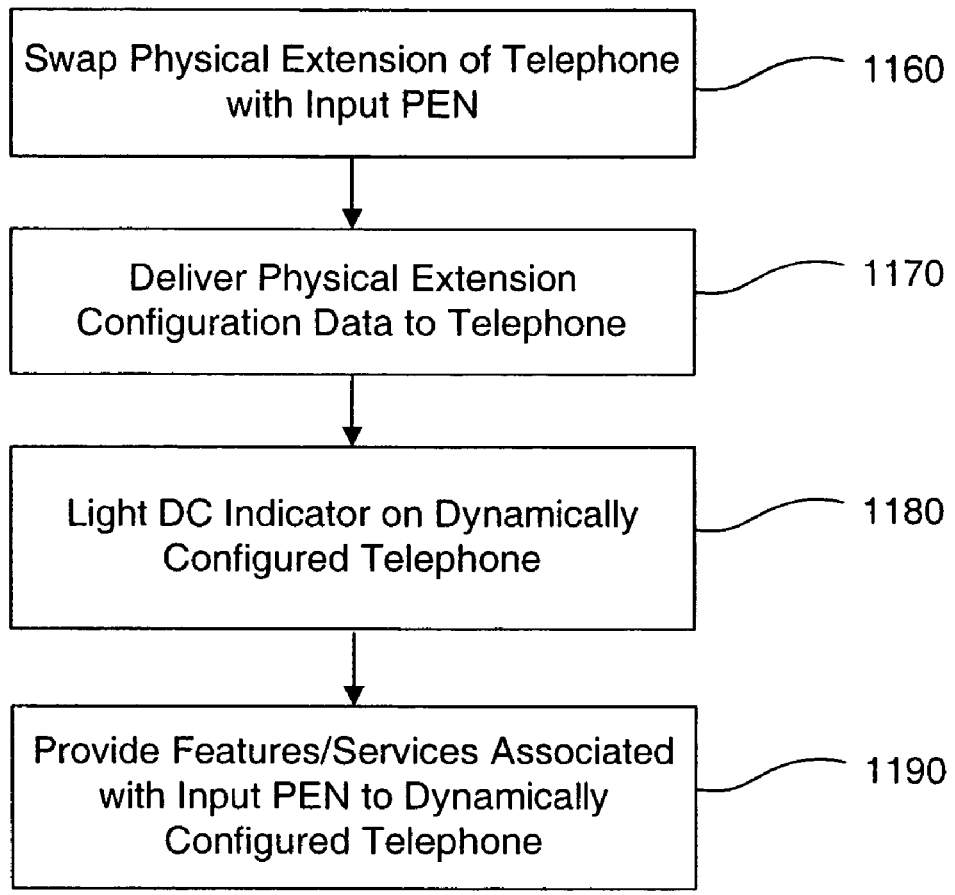

FIGS. 11A and 11B are a flowchart diagram of a routine 1100 for dynamic configuration of a telephone with physical extensions (steps 1110–1190). Routine 1100 operates similarly to routine 400 described above, except that virtual extensions are not used. In step 1110, a user initiates a dynamic configuration at a telephone. For example, a user at telephone 106 can press a dynamic configuration button. In step 1120, a prompt is presented for a user's physical extension. For example, dynamic configuration module 120 can send a command to instruct telephone 106 to display a prompt for the user's physical extension.

In step 1130, the user inputs his or her physical extension. The user can input the physical extension through a keypad on a panel of telephone 106.

Dynamic configuration module 120 then receives the input physical extension and performs a check to determine if the entry is valid (step 1135). If the physical extension entry is invalid, in that it is not a physical extension associated with telephone system 101 or it is in an improper format or other error, then control proceeds to step 1136, and routine 1100 is ended. If the entry is valid, then control proceeds to step 1140. In step 1140, a user is presented with a prompt for a password. For example, dynamic configuration module 120 in FIG. 1 can send a command to telephone 106 to display a prompt for password on a panel. In step 1150, a user inputs a password. For example, a user at telephone 106 can input a password using a keypad on a panel of telephone 106.

In step 1155, a check is made to determine if the password entry is valid. For example, dynamic configuration module 120 can evaluate the password inputted at telephone 106 and sent to dynamic configuration module 120. If the password is not valid, then control proceeds to step 1156, and routine 1100 ends. If the entry is valid, then control proceeds to step 1160.

As shown in FIG. 11B, in step 1160 the physical extension of the telephone to be dynamically configured is swapped with the physical extension input by the user in step 1130. Dynamic configuration module 120 swaps the physical port information associated with the physical extension of the telephone to be configured and the physical extension input by the user. FIG. 10 shows in tabular form how physical port information may be changed in step 1160. Table 1010 is identical to table 300 described previously, except that the physical ports for physical extensions 3002 and 3006 have been swapped. For example, this would occur when a user (Jimi) inputs physical extension 3002 in step 1130 at telephone 106 associated with physical extension 3006. In step 1160, then, dynamic configuration module 120 swaps the physical port 3 information formerly associated with physical extension 3006, for the physical port 1 information associated with the physical extension 3002 input by the user.

Steps 1170–1190 then proceed similar to steps 470–490 in FIG. 4B, described above. In step 1170, physical extension configuration data is delivered to the telephone that is being dynamically configured. Such physical extension configuration data can include information relating to the physical phone features, including but not limited to button map assignments, call forwarding, call waiting, forward, transfer and hold, and other features and/or services of telephone network 101. FIG. 11 is illustrative and not intended to limit the present invention. For example, the physical configuration data can be stored in a memory coupled to the switch in some embodiments.

In step 1180, a dynamic configuration indicator is lit on the dynamically configured telephone. For example, dynamic configuration module 120 can send a command to telephone 106 to indicate that the telephone 106 has been dynamically configured. In step 1190, features associated with the input physical extension are then provided to the dynamically configured telephone. In other words, switch 110 operates to process inbound calls and inbound messages and inputs from the telephone, as described previously with respect to step 490 and FIGS. 6–8.

For example, to process inbound calls directed to the physical extension input by the user, switch 110 looks up physical port information associated with the physical extension and then routes the calls accordingly. In this way, inbound calls are routed to a dynamically configured telephone, based on the physical extension input by the user during dynamic configuration. Similarly, messages received from applications such as voicemail applications or other telephone service applications that are directed to a physical extension, are similarly processed by switch 110. Switch 110 identifies physical port information associated with the physical extension and delivers it to the dynamically configured telephone accordingly.

Inputs made at the dynamically configured telephone are likewise received at a physical port associated with the dynamically configured telephone. Switch 110, however, looks up the physical extension associated with the physical port, and because of the swapping described with respect to step 1160, processes the inputs based on the appropriate phone features and other configuration data associated with the physical extension input by the user during dynamic configuration.

4. Remote VoIP Phone

Figure 12:
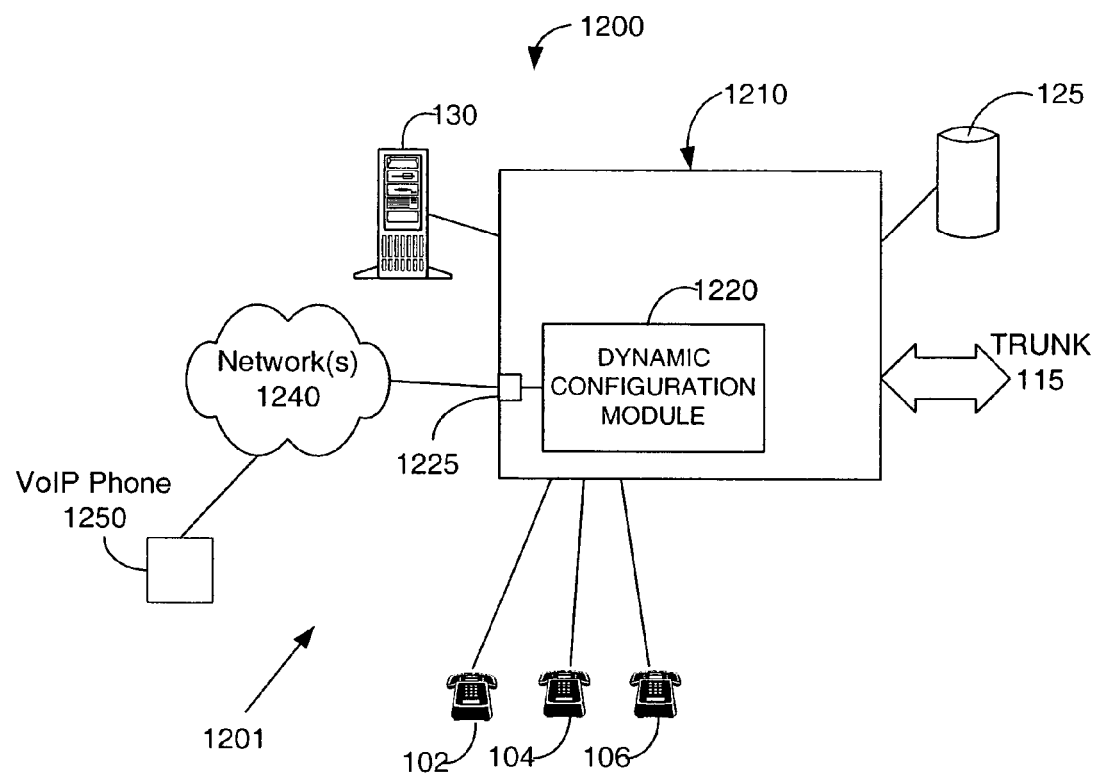
FIG. 12 is a block diagram of a system for providing dynamic configuration of telephones including a remote VoIP telephone in a telephone system according to an embodiment of the present invention.

According to a further feature of the present invention, dynamic configuration can also be carried out for telephones with a telephone system that includes remote phones. Referring to FIG. 12, system 1200 includes a switch 1210 and a dynamic configuration module 1220. Switch 1210 and dynamic configuration module 1220 operate similarly to switch 110 and dynamic configuration module 120 respectively, described in detail above. For example, system 1200 includes provisioning tool 130 and memory 125 coupled to switch 1210. Switch 1210 couples telephones in a telephone system 1201 to trunk 115. In this embodiment, telephone system 1201 also includes a voice over IP (VoIP) phone 1250 coupled to switch 1210 over a network 1240 through port 1225 in switch 1210. Switch 1210 then includes physical ports for coupling telephones 102, 104, 106 and port 1225 for coupling a remote VoIP phone 1250. In one example, port 1225 is any type of communication port including but not limited to a network port for coupling to a network, such as the Internet.

System 1200 operates like system 100 in FIG. 1 described above. One difference is provisioning tool 130 provisions physical extensions for each of the physical ports coupled to telephones 102, 104 and 106, and further provisions a physical extension for the remote phone 1250. In this case, the provisioning is made for a network port. Otherwise, switch 1210 and dynamic configuration module 1220 can operate to support a virtual configure mode and/or a physical configure mode, as described above with respect to FIGS. 2–11.

FIG. 13 shows, in tabular form, virtual extension configuration data, including but not limited to virtual extensions, user IDs, and physical phone feature information. In the example shown in FIG. 13, Table 1300 includes a first entry having fields that associates virtual extension 3002 with user ID 1 and physical phone feature information. A second entry is provided that associates virtual extension 3004 with user ID 2 and physical phone feature information. A third entry is provided for virtual extension 3006 and associated user ID 3 and physical phone feature information. A fourth entry is provided that associates a remote VoIP phone with a network port and physical phone feature information. The remote VoIP phone may be associated with an IP address of a telephone 102, 104, 106 in the telephone system 101, for example.

The present invention can be implemented in any telephone system, including but not limited to a telephone system FXII coupled to IPRIMO telephones both available from Comdial Corporation, a Delaware corporation. Telephones 102, 104, 106 are illustrative and not intended to limit the present invention. Telephones 102, 104, 106 can be any type of telephone, including but not limited to, a digital telephone available from Comdial such as an Impact telephone, an internet protocol (IP) telephone such as an IPRIMO telephone, or other type of telephone or terminal equipment. As used herein, the term "telephone" refers to any type of terminal equipment or device for coupling at least voice and/or data to a telephone system.

Switches 110, 1210 can be any type of switch including but not limited to a private branch exchange (PBX) or central office switch. Trunk 115 is illustrative, and in general the present invention can be used with any type and any number of trunk lines depending upon the capacity of switches 110, 1210.

5. Computer System Platform

Figure 14:
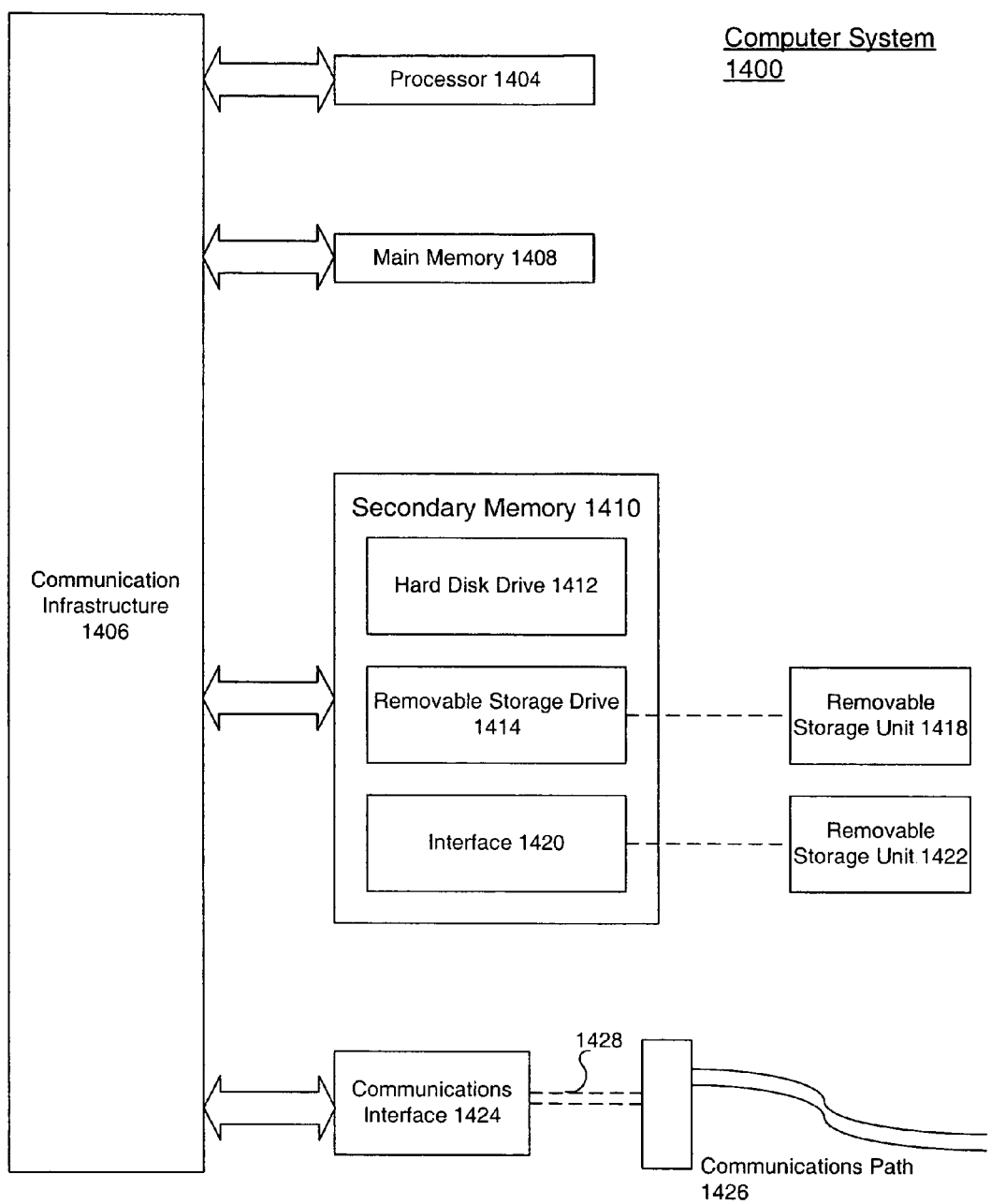
FIG. 14 is a block diagram of a computer system platform in an embodiment of the present invention.

The present invention including dynamic configuration modules 120, 1220 may be implemented using hardware, software or a combination thereof and may be implemented in a computer system or other processing system. In an embodiment, the invention is directed toward a computer program product executing on a computer system capable of carrying out the functionality described herein, particularly that of dynamic configuration modules 120, 1220. An example of a computer system 1400 is shown in FIG. 14. The computer system 1400 includes one or more processors, such as processor 1404. The processor 1404 is connected to a communication infrastructure 1406, such as a communication bus. Various software embodiments are described in terms of this example computer system. After reading this description, it will become apparent to a person skilled in the relevant art how to implement the invention using other computer systems and/or computer architectures.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. Removable storage unit 1418, represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative embodiments, secondary memory 1410 may include other similar means for allowing computer programs or other instructions to be loaded into computer system 1400. Such means may include, for example, a removable storage unit 1422 and an interface 1420. Examples of such may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (i.e., channel) 1426. This channel 1426 carries signals 1428 and may be implemented using wire or cable, fiber optics, a phone line, a cellular phone link, an RF link and other communications channels. In an embodiment of the invention, signals 1428 comprise input values, multiplier X and multiplicand Y. Alternatively, these values can be read from secondary memory 1410.

In this document, the terms "computer program medium" and "computer usable medium" are used to generally refer to media such as removable storage drive 1414, a hard disk installed in hard disk drive 1412, and signals 1428. These computer program products are means for providing software to computer system 1400.

Computer programs (also called computer control logic) are stored in main memory 1408 and/or secondary memory 1410. Computer programs may also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

In an embodiment where the invention is implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

The present invention is advantageous in a variety of applications. Being able to leverage configuration information from any telephone in a telephone system is especially beneficial to users who need to use a telephone temporarily (such as a worker using a telephone at a temporary workspace) or for several users who share a common pool of telephones (such as workers using desks with telephones on an as needed basis). Users can then customize phone features and leverage this customization at any dynamically configurable telephone in a telephone system. This can improve efficiency and utilization of telephone features, such as, configurable button assignments, voice mail, call forwarding, conferencing, hold, transfer, call waiting and/or any other telephone feature. Embodiments of the invention can cover a variety of platforms and applications.

6. Conclusion

The present invention can be implemented in software, firmware, hardware or any combination thereof. In examples, the present invention can be implemented in control logic in an processing device, including but not limited to, a general purpose computer, specific purpose computer, server, workstation, personal computer (desktop, laptop, or palm top), personal digital assistant (PDA), network appliance, network component (e.g., switch), telephone unit, game console, or a set-top box.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The invention claimed is:

1. A system, comprising:
   a plurality of telephones including at least one dynamically configurable telephone having at least one of an input for toggling on and off dynamic configuration of the telephone by a user or an indicator for indicating whether dynamic configuration is on or off;
   a switch that directs telephone calls carried between telephones and at least one trunk, said switch including physical and virtual extensions, wherein each physical extension corresponds to a link to a respective telephone and each virtual extension corresponds to a respective user; and
   a dynamic configuration module that associates a physical extension of the at least one dynamically configurable telephone with a virtual extension input by a user at the at least one dynamically configurable telephone when the user initiates a dynamic configuration of the telephone and wherein the dynamic configuration module further sends a signal to the telephone indicating the dynamic configuration of the telephone is complete, whereby features associated with the virtual extension input by the user are delivered to the dynamically configurable telephone.

2. The system of claim 1, wherein said switch comprises a private branch exchange.

3. The system of claim 1, wherein said switch comprises a central office switch.

4. The system of claim 1, wherein said dynamic configuration module delivers virtual extension configuration data to the telephone.

5. The system of claim 1, wherein said switch supports the features or services delivered to the telephone.

6. The system of claim 1, further comprising a memory coupled to said switch and said dynamic configuration module.

7. The system of claim 6, wherein said memory stores a first group of data including associated physical extensions, ports and phone features.

8. The system of claim 7, wherein said memory stores a second group of data including virtual extensions, user identifiers, phone features, and mapping information, and
   wherein said dynamic configuration module sends mapping information to said memory that associates the physical extension of the telephone with the virtual extension input by the user.

9. The system of claim 8, wherein said phone features include at least one selected from the group of call forwarding, voice mail, button-map assignments, conference calling, call waiting, hold, and transfer.

10. The system of claim 1, wherein the telephone includes the input for toggling on and off dynamic configuration of the telephone by a user, and the indicator for indicating whether dynamic configuration is on or off.

11. The system of claim 10, wherein said input comprises a button on a panel of the telephone, and said indicator comprises a visible indicator on the panel.

12. The system of claim 1, wherein said switch further includes a port for enabling an administrator to provision physical and virtual extensions.

13. The system of claim 1, wherein said switch further includes a network port for coupling a VoIP telephone to said switch.

14. The system of claim 1, wherein said dynamic configuration module checks whether the virtual extension input by the user is valid and a password input by the user is valid before associating the physical extension of the telephone with the virtual extension input.

15. A system, comprising:
    a plurality of telephones including at least one dynamically configurable telephone having at least one of an input for toggling on and off dynamic configuration of the telephone by a user or an indicator for indicating whether dynamic configuration is on or off;
    a switch that couples telephones and at least one trunk, said switch including physical extensions, wherein each physical extension corresponds to a link to a respective telephone; and
    a dynamic configuration module that associates a physical extension of the at least one dynamically configurable telephone with a physical extension input by a user at the at least one dynamically configurable telephone when the user initiates a dynamic configuration of the telephone and wherein the dynamic configuration module further sends a signal to the at least one dynamically configurable telephone indicating the dynamic configuration of the telephone is complete, whereby features associated with the physical extension input by the user are delivered to the at least one dynamically configurable telephone.

16. The system of claim 15, wherein said switch comprises at least one of a private branch exchange and a central office switch.

17. The system of claim 15, further comprising a memory coupled to said switch and said dynamic configuration module.

18. The system of claim 17, wherein said memory stores a first group of data including associated physical extensions, ports and phone features.

19. The system of claim 18, wherein said dynamic configuration module swaps port information stored in said memory so as to associate the physical extension of the telephone with the physical extension input by the user.

20. The system of claim 15, wherein said switch further includes a network port for coupling a VoIP telephone to said switch.

21. In a telephone system having a switch that couples telephones and at least one trunk, the switch including physical and virtual extensions, wherein each physical extension corresponds to a link to a respective telephone and each virtual extension corresponds to a respective user, a method for dynamically configuring a first telephone for use by a first user comprising:
    receiving a virtual extension input by the first user through the first telephone;
    associating a physical extension of the first telephone with the input virtual extension, whereby features associated with the input virtual extension are delivered to the first telephone;
    sending a signal to the first telephone indicating the dynamic configuration of the first telephone is complete; and
    providing an indication on the first telephone when the signal is received at the first telephone.

22. The method of claim 21, further comprising presenting a first prompt at the first telephone that requests input of the virtual extension.

23. The method of claim 22, further comprising presenting a second prompt at the first telephone that requests input of a password associated with the first user.

24. The method of claim 23, further comprising checking whether the virtual extension input and password input are valid prior to said associating step.

25. The method of claim 23, wherein the first telephone includes a visible indicator, and wherein the indication providing comprises illuminating the visible indicator of the first telephone when the signal is received at the first telephone.

26. The method of claim 23, further comprising providing phone features associated with the input virtual extension to the first telephone, the provided phone features including at least one phone feature selected from the group of call forwarding, voice mail, button-map assignments, conference calling, call waiting, hold, and transfer.

27. The method of claim 21, further comprising enabling an administrator to provision physical and virtual extensions at the switch.

28. The method of claim 21, further comprising:
receiving an inbound call to the input virtual extension;
looking up a physical port based on the input virtual extension; and
routing the inbound call to the first telephone at the looked up physical port.

29. The method of claim 21, further comprising:
receiving a message relating the input virtual extension; and
processing the message based on stored feature data relating to the input virtual extension;
looking up a physical port associated with the input virtual extension; and
delivering data corresponding to the processed message over the looked up physical port to the first telephone at the looked up physical port.

30. The method of claim 21, further comprising:
receiving at a physical port a signal corresponding to an input entered at the first telephone;
looking up virtual extension feature data associated with the physical data at which the signal was received; and
processing the signal based on the looked up virtual extension feature data.

31. In a telephone system having a switch that couples telephones and at least one trunk, the switch including physical and virtual extensions, wherein each physical extension corresponds to a link to a respective telephone, a method for dynamically configuring a first telephone for use by a first user comprising:
receiving a physical extension input by the first user through the first telephone;
associating a physical extension of the first telephone with the input physical extension, whereby features associated with the input physical extension are delivered to the first telephone;
sending a signal to the first telephone indicating the dynamic configuration of the first telephone is complete; and
providing an indication on the first telephone when the signal is received at the first telephone.

* * * * *